(12) United States Patent
Jennings et al.

(10) Patent No.: US 6,741,420 B2
(45) Date of Patent: May 25, 2004

(54) HYDRODYNAMIC SPINDLE MOTOR WITH AN INTERNALLY DISPOSED HEATING ELEMENT

(75) Inventors: David J. Jennings, Edina, MN (US); John Elsing, Edina, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 267 days.

(21) Appl. No.: 09/894,809

(22) Filed: Jun. 28, 2001

(65) Prior Publication Data

US 2002/0051312 A1 May 2, 2002

Related U.S. Application Data

(60) Provisional application No. 60/220,715, filed on Jul. 26, 2000.

(51) Int. Cl.[7] .............................................. G11B 19/20
(52) U.S. Cl. ................................................... 360/99.08
(58) Field of Search ........................... 360/99.08, 97.01, 360/97.02, 98.07, 98.08, 99.04, 99.05, 99.12; 389/100, 107, 110, 372

(56) References Cited

U.S. PATENT DOCUMENTS

| | | | |
|---|---|---|---|
| 3,970,816 A | 7/1976 | Hosokawa et al. | 219/205 |
| 4,587,912 A | 5/1986 | Wolff et al. | 112/256 |
| 4,814,652 A * | 3/1989 | Wright | 360/98.07 |
| 4,814,908 A | 3/1989 | Schmitz | 360/77.02 |
| 4,940,114 A | 7/1990 | Albrecht | 184/6.3 |
| 5,095,396 A | 3/1992 | Putnam et al. | 360/106 |
| 5,103,335 A | 4/1992 | Sugiura | 359/212 |
| 5,394,040 A * | 2/1995 | Khanh | 310/64 |
| 5,448,120 A * | 9/1995 | Schaule et al. | 310/90 |
| 5,524,985 A | 6/1996 | Dunfield | 384/107 |
| 5,705,868 A * | 1/1998 | Cox et al. | 310/71 |
| 5,895,590 A | 4/1999 | Suzuki | 219/205 |
| 6,065,877 A | 5/2000 | Leuthold et al. | 384/278 |
| 6,528,909 B1 * | 3/2003 | Kan et al. | 310/52 |

FOREIGN PATENT DOCUMENTS

| | | | |
|---|---|---|---|
| JP | 01137425 | * | 5/1989 |
| JP | 05019201 | * | 1/1993 |
| JP | 05166291 | * | 7/1993 |
| JP | 06004988 | * | 1/1994 |
| JP | 06096514 | * | 4/1994 |
| JP | 06150527 | * | 5/1994 |
| JP | 06162459 | * | 6/1994 |

* cited by examiner

Primary Examiner—A. J. Heinz
Assistant Examiner—Angel Castro
(74) Attorney, Agent, or Firm—Westman, Champlin & Kelly, P.A.

(57) ABSTRACT

A hydrodynamic spindle motor including an internally disposed heating element in a stationary spindle portion having a spindle hub rotatably coupled thereto. The hydrodynamic spindle motor has particular application for supporting discs for co-rotation for a disc drive. The heating element is activated to control viscosity of a hydrodynamic fluid of a hydrodynamic bearing rotationally supporting the spindle hub relative to the stationary spindle. Operation of the heating element reduces viscosity of the hydrodynamic fluid to reduce motor power requirements and improve "up-to-speed" time.

24 Claims, 5 Drawing Sheets

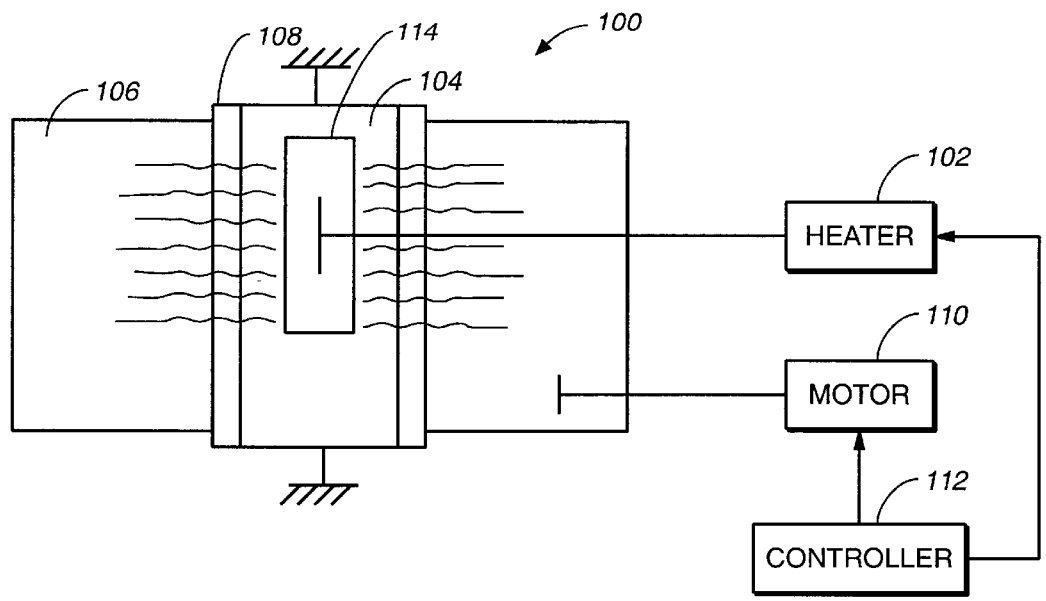
FIG._1
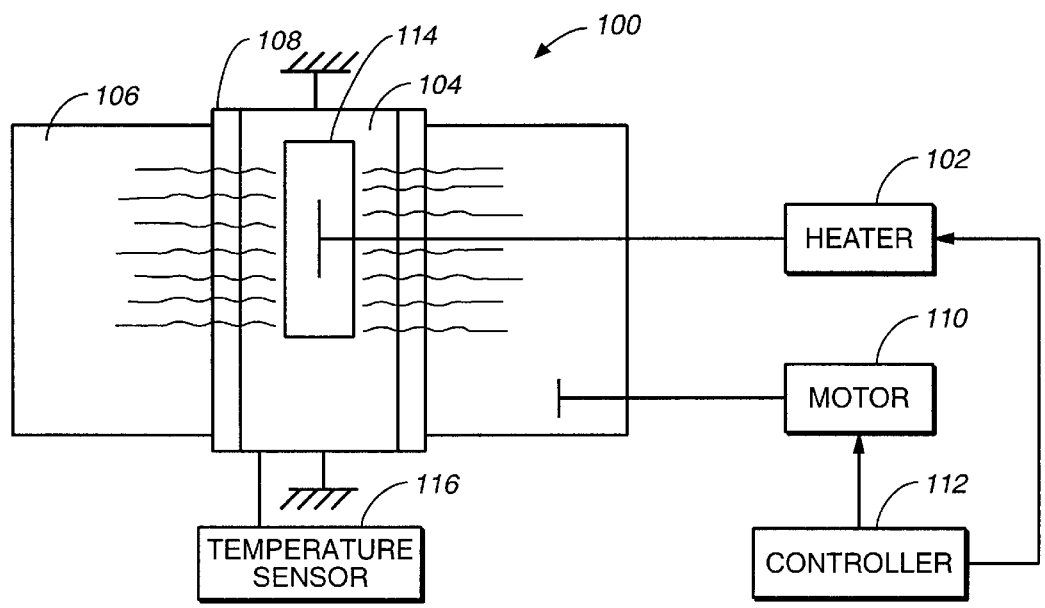
FIG._1-1

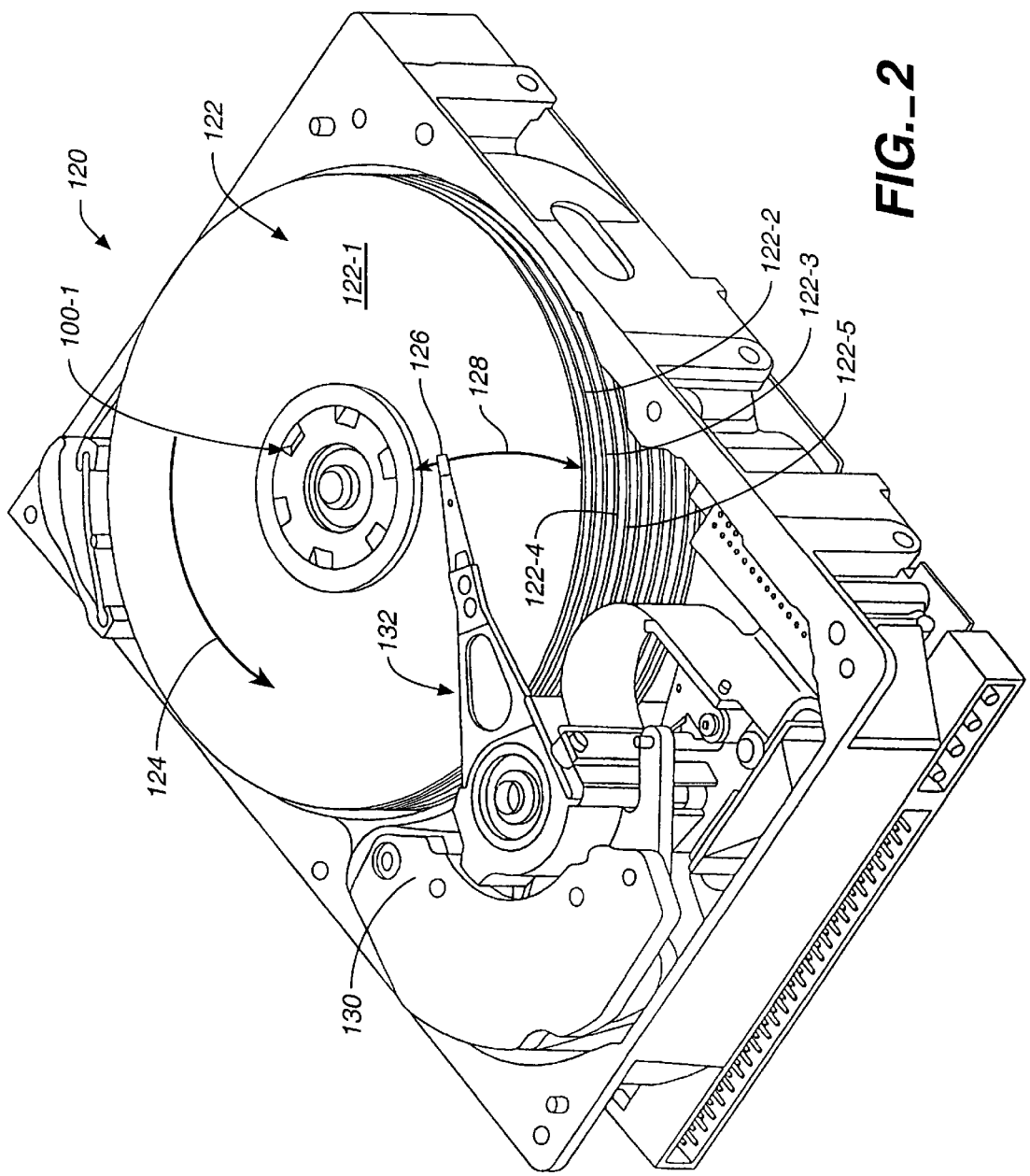
FIG._2

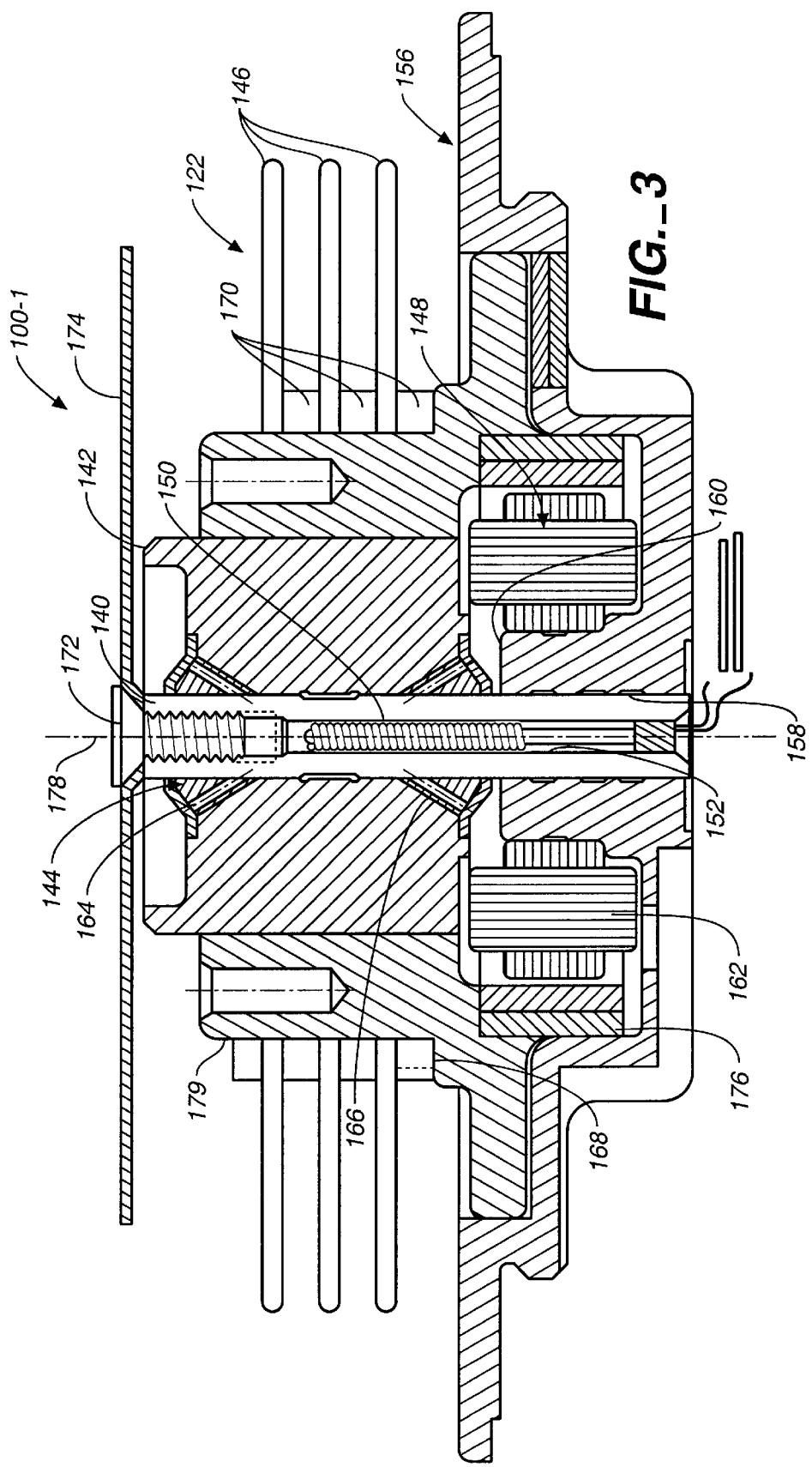

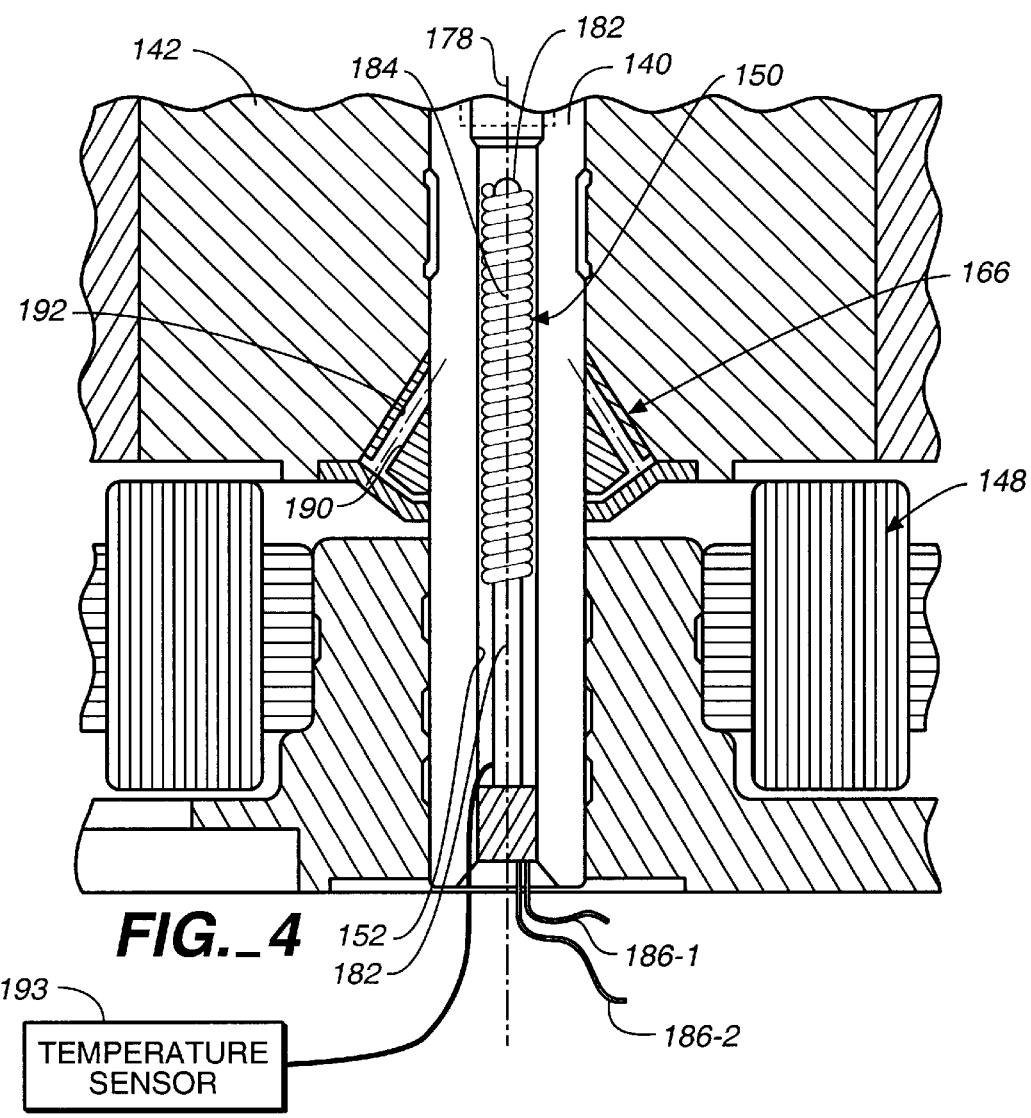
FIG._4

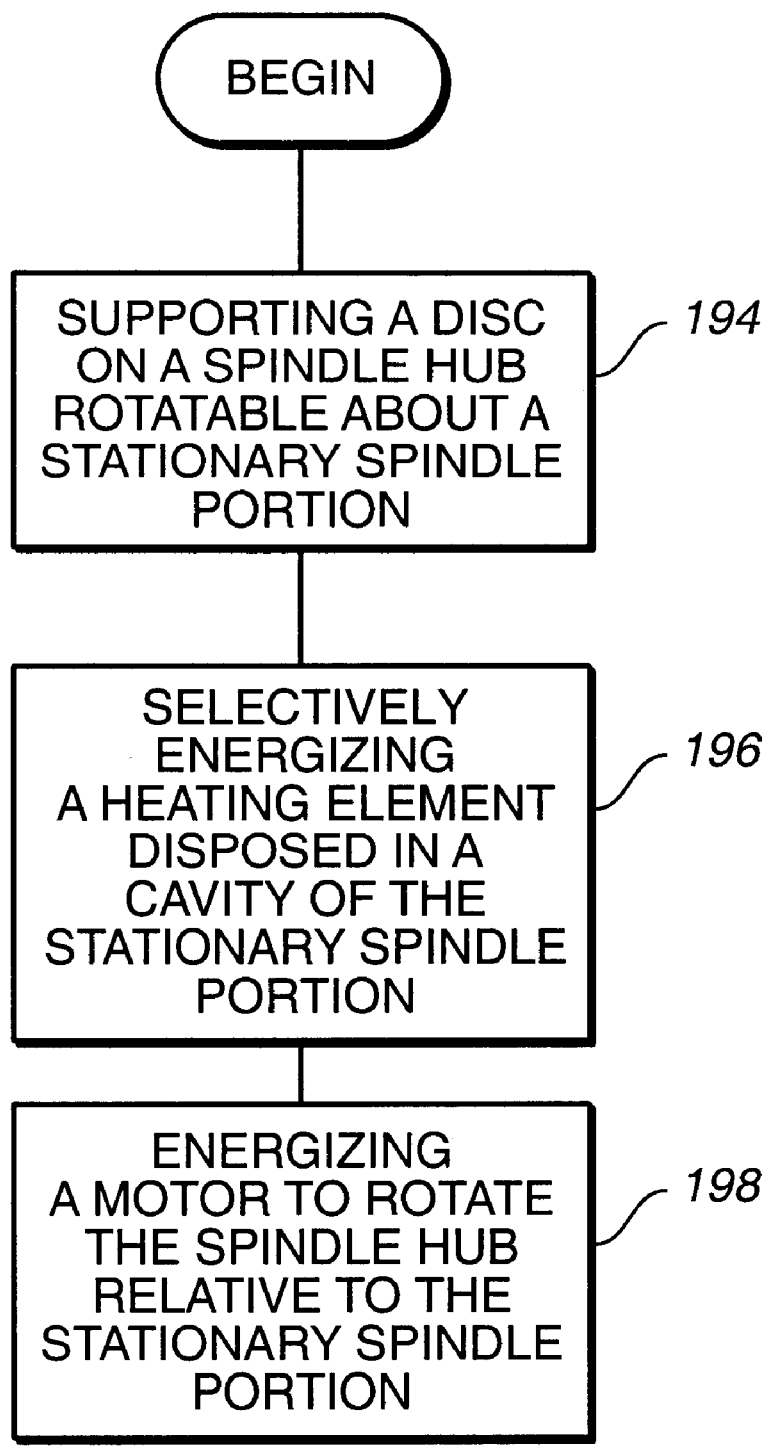
FIG._5

HYDRODYNAMIC SPINDLE MOTOR WITH AN INTERNALLY DISPOSED HEATING ELEMENT

CROSS-REFERENCE TO RELATED APPLICATION

This application claims priority to Provisional Application Ser. No. 60/220,715, filed Jul. 26, 2000 and entitled "HEATING ELEMENT FOR HYDRODYNAMIC SPINDLE."

FIELD OF THE INVENTION

The present invention relates generally to a spindle motor, and more particularly to a hydrodynamic spindle motor with a hydrodynamic heating element.

BACKGROUND OF THE INVENTION

Hydrodynamic spindle motors include a spindle hub rotatably coupled to a stationary spindle portion through a hydrodynamic interface. The spindle hub rotates relative to the stationary spindle portion by operation of a motor coupled to the stationary spindle portion and the spindle hub. Hydrodynamic spindle motors are used in some applications to rotate a disc stack for operation of a disc drive. Discs are stacked on the spindle hub for co-rotation. For operation, power is supplied to the motor to rotate the spindle hub. Sufficient power must be supplied to overcome drag or friction between the hydrodynamic fluid and the rotating components. During idle periods, such as during a power save mode, or when the disc drive is powered "off", the temperature of the hydrodynamic fluid can drop, increasing viscosity of the fluid. This is especially true at extreme operating temperature ranges. This increased viscosity of the hydrodynamic fluid increases power required to initiate rotation and rotate the spindle motor "up to speed" for operation of the disc drive. Embodiments of this invention address these and other features and provides advantages not previously recognized nor appreciated in the prior art.

SUMMARY OF THE INVENTION

The present invention relates generally to a hydrodynamic spindle motor including an internally disposed heating element in a stationary spindle portion having a spindle hub rotatably coupled thereto. The hydrodynamic spindle motor has particular application for supporting discs for co-rotation for a disc drive. The heating element is activated to control viscosity of a hydrodynamic fluid of a hydrodynamic bearing rotationally supporting the spindle hub relative to the stationary spindle portion. These and various other features as well as advantages which characterize embodiments of the present invention will be apparent upon reading the following detailed description and review of the associated drawings.

BRIEF DESCRIPTION OF THE DRAWINGS

FIG. 1 is a diagrammatic illustration of an embodiment of a hydrodynamic spindle motor with an internally disposed heating element.

FIG. 1—1 is a diagrammatic illustration of an embodiment of a hydrodynamic spindle motor with an internally disposed heating element.

FIG. 2 is a perspective illustration of a disc drive including a spindle motor.

FIG. 3 is a cross-sectional view of an embodiment of a hydrodynamic spindle motor with an internally disposed heating element.

FIG. 4 is an enlarged detailed view of a portion of FIG. 3.

FIG. 5 is an operation flow chart for a hydrodynamic spindle motor of a disc drive.

DETAILED DESCRIPTION OF ILLUSTRATIVE EMBODIMENTS

FIGS. 1 and 1—1 schematically illustrate embodiments of a hydrodynamic spindle motor 100 including a heating element 102 to maintain or control the temperature of a hydrodynamic fluid. As shown in FIGS. 1 and 1—1, the spindle motor 100 includes a stationary spindle portion 104 and a spindle hub 106 rotatably supported relative to the stationary spindle portion 104 through a hydrodynamic bearing 108. A motor 110 illustrated diagrammatically rotates spindle hub 106 relative to the stationary spindle portion 104 under the control of a controller 112.

Hydrodynamic fluids have different viscosity parameters at different temperature ranges. Prior to operation, the spindle motor 100 and hydrodynamic bearing 108 are relatively cool or are at an ambient or surrounding temperature. The cooler temperature of the hydrodynamic bearing 108 increases the power required to rotate the spindle hub 106 because of drag or friction introduced by the higher viscosity hydrodynamic fluid. During operation heat dissipated by motor 110, and operating components, windage and fluid shear increase the temperature of the hydrodynamic fluid of the hydrodynamic bearing, reducing viscosity of the fluid which reduces operation power requirements.

Thus, while the motor is cooler, such as prior to operation of the spindle motor or following an idle period, viscosity of the fluid is high in comparison to the viscosity of the hydrodynamic fluid after the spindle motor 100 has been operating for a while and has warmed up. As illustrated in FIGS. 1 and 1—1, heater 102 is coupled to controller 112 to selectively energize the heater for operation. In one embodiment, controller 112 operates heater 102 in cooperation with operation of motor 110 to heat the hydrodynamic fluid for operation of the spindle motor following an idle period or a "powered off" period. The heater 102 is energized by the controller 112 to raise the temperature of the hydrodynamic fluid of the bearing for a "start-up" mode of the spindle motor 100. After the spindle motor has "warmed up" the controller 112 can be configured to deactivate the heater 102 during an operating mode of the spindle motor 100.

In particular, to reduce operating delays, it is desirable to shorten the start-up period for the time interval between activation of the motor 100 until the spindle hub 106 rotates at full operating speed. As shown in FIGS. 1 and 1—1, heater 102 is disposed in a cavity 114 of the stationary spindle portion 104. Heat radiates outwardly to heat the hydrodynamic fluid of the hydrodynamic bearing 108 circumferentially surrounding the heating element. The internally disposed position of the heating element efficiently controls or increases the temperature of the hydrodynamic fluid by minimizing heat loss to ambient. The rapid heating response of the hydrodynamic bearing reduces operating delays for the spindle hub 106 to attain full operating speed.

In one embodiment illustrated in FIG. 1—1, operation of heater 102 can be controlled through feedback of a temperature sensor 116 which provides temperature feedback for the hydrodynamic fluid. Thus, after the spindle motor has "warmed up" as measured by temperature sensor 116, the controller 112 is configured to deactivate the heater 101 for operation of the spindle motor 100, during the operating mode of the spindle motor 100.

As shown in FIGS. 2–3, the hydrodynamic spindle motor 100 has particular application for a disc drive 120. As shown in FIG. 2, disc drive 120 includes a disc stack 122 supported for rotation as illustrated by arrow 124 by a spindle motor 100-1. Heads 126 are supported relative to discs 122-1 through 122-n in the disc stack 122 to read or write information to or from the discs. In the embodiment shown, discs includes a magnetizable media for read/write operations. Heads 126 are positioned relative to selected data tracks as illustrated by arrow 128 by operation of a voice coil motor 130. Heads 126 are supported by an actuator block 132 which is moved or powered by voice coil motor 130.

FIG. 3 is a cross-sectional view of an embodiment of a disc stack 122 rotated by operation of a hydrodynamic spindle motor 100-1. In the embodiment shown, spindle motor includes a stationary spindle portion 140 and a spindle hub 142. Spindle hub 142 is rotationally coupled to stationary spindle portion 140 via a hydrodynamic fluid bearing 144. Discs 146 are stacked on the spindle hub 142 and spindle hub 142 rotates via operation of a motor 148 for operation of the disc drive. In the embodiment shown, stationary spindle portion 140 is an elongated shaft and forms an inner stationary shaft about which outer spindle hub 142 rotates.

As shown, hydrodynamic fluid of the hydrodynamic bearing 144 is heated by heating element 150 disposed in an inner cavity or bore 152 of stationary spindle portion 140. As previously described, heating element 150 is activated to selectively increase the temperature of the hydrodynamic fluid to control or maintain viscosity of the fluid to limit drag, reduce power consumption and reduce the "up to speed" time for the disc stack to attain "full operating speed", particularly following periods where the motor 148 is idle or "powered off" and the viscosity of the hydrodynamic fluid has increased.

In the embodiment shown, spindle motor 100-1 is coupled to a deck 156 of the disc drive through stationary spindle portion 140. A first end of the elongated spindle shaft is supported in bore 158 of deck 156. In the embodiment shown, bore 158 extends into a raised platform 160 which supports energizable coil 162. Spindle hub 142 is rotationally coupled to elongated stationary spindle portion or shaft 140 through hydrodynamic bearing 144 including spaced first and second bearing portions 164, 166. Spindle hub 142 supports disks 146 which are stacked on ledge 168 separated by spacers 170. As shown, a fastener member 172 secures a second end of stationary spindle portion or elongated shaft 140 to a cover 174 of the disc drive. A seal cover (not shown) contains hydrodynamic fluid in a hydrodynamic gap of bearing portions 164, 166. Spindle hub 142 includes a magnet 176 which is supported relative to the energizable coil 162 to form motor 148. Operation of motor 148 rotates the spindle hub 142 about axis 178 for disc drive operation.

FIG. 4 is a detailed view illustrating cavity 152 in the stationary spindle shaft and the heating element 150 disposed therein. In the embodiment shown, heating element 150 is formed of an elongated rod 182 having a heating coil 184 wrapped therearound. Power is supplied to coil 184 through leads 186-1, 186-2 to activate the heating element 150. In the illustrated embodiment, cavity 152 is an elongated bore aligned with rotation axis 178. As shown, bearing portions 164, 166 (only bearing portion 166 is illustrated in FIG. 4) include conical interfacing surfaces 190, 192 on the spindle portion or elongated shaft 140 and spindle hub 142. A hydrodynamic fluid is disposed in the hydrodynamic gap between the conical interfacing surfaces 190, 192. Activation of heating element 150 radiates heat to reduce fluid viscosity to a desired operating level.

As shown, the hydrodynamic fluid circumferentially surrounds heating element 150 in cavity 152 to optimize heating for a desired power level and to provide a rapid response to reduce operating "start-up" times. This invention also has particular application for a lower powered system or battery powered system where lower power or energy consumption is desired. Also for a given power dissipated, the arrangement described hereinabove best distributes the thermal energy directly to the load portion of the hydrodynamic bearing, that is, the thermal energy heating fluid radiates outwardly from the stationary spindle portion along a portion of the rotating hub supporting the discs. In the particular embodiment illustrated in FIG. 4, a temperature sensor 193 provides temperature feedback for controlling operation of the heating element 150 to provide desired operating control.

Thus, as shown in FIG. 5, for operation, the disc is supported on the spindle hub 142 rotatable about the stationary spindle portion 140 as illustrated by block 194. For operation, for example, following an idle period or "powered off" period, the heating element disposed in the cavity is energized to reduce viscosity of the hydrodynamic fluid of a hydrodynamic bearing as illustrated by block 196. The motor is energized to rotate the spindle hub relative to the stationary spindle portion as illustrated by block 198. The heating element 150 heats the fluid to reduce viscosity to improve "start up" and reduce the time period for the spindle hub to reach full operating speed and to reduce motor power requirements.

A hydrodynamic spindle motor including an internally disposed heating element (such as 102, 150) in a stationary spindle portion (such as 104, 140) having spindle hub (such as 106, 142) rotatably coupled thereto. The hydrodynamic spindle motor has particular application for supporting discs (such as 122, 146) for co-rotation for a disc drive. The heating element (such as 102, 150) is activated to reduce viscosity of a hydrodynamic fluid of a hydrodynamic bearing (such as 108, 144) rotationally supporting the spindle hub (such as 106, 142) relative to the stationary spindle portion (such as 104, 140).

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the preferred embodiment described herein is directed to a magnetic disc drive system, it will be appreciated by those skilled in the art that the teachings of the present invention can be applied to other systems, without departing from the scope and spirit of the present invention and not limited to the particular application shown.

What is claimed is:

1. A hydrodynamic spindle motor comprising:
   an inner spindle portion;
   an outer spindle portion;
   a hydrodynamic bearing disposed between the inner spindle portion and the outer spindle to rotationally couple the outer spindle portion relative to the inner spindle portion;

a heating element disposed relative to the inner spindle portion; and a motor operably coupled to the inner spindle portion and the outer spindle portion.

2. The hydrodynamic spindle motor of claim 1 wherein the outer spindle portion forms a spindle hub having at least one disc on the spindle hub.

3. The hydrodynamic spindle motor of claim 2 further comprising a plurality of discs stacked on the spindle hub.

4. The hydrodynamic spindle motor of claim 1 wherein the hydrodynamic bearing includes first and second spaced conical bearing portions.

5. The hydrodynamic spindle motor of claim 1 wherein the inner spindle portion is stationary spindle shaft and the outer spindle portion forms a spindle hub rotatable about the inner spindle shaft.

6. The hydrodynamic spindle motor of claim 5 wherein the outer spindle hub supports a plurality of stacked discs.

7. The hydrodynamic spindle motor of claim 1 wherein the inner spindle portion is an elongated shaft including a center bore therein to form a spindle cavity having the heating element disposed therein.

8. The hydrodynamic spindle motor of claim 1 wherein the motor includes an energizable coil coupled to the inner-spindle portion and a magnet coupled to the outer spindle portion-to rotate the outer spindle portion relative to the inner spindle portion.

9. The hydrodynamic spindle motor of claim 1 wherein the heating element includes leads coupleable to a power source.

10. The hydrodynamic spindle motor of claim 1 wherein the heating element includes a heating coil.

11. A hydrodynamic spindle motor comprising:

a stationary spindle portion including a heating element including an elongated rod having a heating coil wrapped therearound disposed in a heating cavity;

a spindle hub;

a hydrodynamic bearing rotationally coupling the spindle hub relative to the stationary spindle portion; and a motor operably coupled to the stationary spindle portion and the spindle hub to rotate the spindle hub relative to the stationary spindle portion.

12. The hydrodynamic spindle motor of claim 11 and further comprising a power source coupled to leads of the heating coil wrapped around the elongated rod.

13. A spindle assembly comprising:

an inner spindle portion;

an outer spindle portion;

a hydrodynamic bearing interposed between the inner spindle portion and the outer spindle portion; and a heating element disposed relative to the inner spindle portion.

14. The spindle assembly of claim 13 wherein the outer spindle portion rotates relative to the inner spindle portion and including at least one disc supported on the outer spindle portion.

15. The spindle assembly of claim 13 wherein the spindle assembly further includes a controller operably coupled to the heating element to selectively operate the heating element to heat fluid of the hydrodynamic bearing.

16. The spindle assembly of claim 15 and further comprising a temperature sensor coupled to the controller to provide temperature feedback to selectively operate the heating element.

17. The spindle assembly of claim 13 wherein the inner spindle portion forms a stationary spindle shaft having the heating element and the outer spindle portion forms a spindle hub rotatable about the stationary spindle shaft.

18. The spindle assembly of claim 17 wherein the stationary spindle shaft includes an elongated spindle heating cavity having an elongated axis aligned with a rotation axis of the spindle hub about the stationary spindle shaft and including an elongated heating element disposed therein.

19. The spindle assembly of claim 13 wherein the heating element includes a heating coil.

20. The spindle assembly of claim 13 wherein the heating element is coupleable to a power source to energize the heating element.

21. The spindle assembly of claim 13 wherein the heating element includes leads coupleable to a power source.

22. A method comprising steps of:

energizing a heating element disposed relative to a stationary spindle portion to radiate heat outwardly from the stationary spindle portion to heat a fluid bearing disposed between the stationary spindle portion and a spindle hub; and energizing a motor to rotate the spindle hub relative to the stationary spindle portion.

23. The method of claim 22 wherein the heating element is energized for a "start up" mode and is de-energized during an "operation" mode.

24. The method of claim 23 wherein the heating element is energized for the "start up" mode and is de-energized during the "operation" mode based upon feedback from a temperature sensor.

* * * * *